United States Patent Office 3,403,031
Patented Sept. 24, 1968

3,403,031
HOMEMADE ICE CREAM PREPARATION
Allie B. Holmes, Box 698, Mathis, Tex. 78368
No Drawing. Filed Dec. 29, 1965, Ser. No. 517,452
3 Claims. (Cl. 99—136)

ABSTRACT OF THE DISCLOSURE

Process for making homemade ice cream by mixing ice cream ingredients and, without soft freezing, hard freezing into storage blocks and thereafter confinably crushing and pressure churning the storage blocks.

---

This invention relates to ice cream, and more particularly is concerned with the preparation of a frozen homemade ice cream mix, and the subsequent processing of the mix in the home.

It is generally known that homemade ice cream contains no ingredients to prevent crystallization. It is composed primarily of ordinary whole milk, eggs, and other ingredients found in the home, and will thus separate and crystallize if placed in ordinary freezer trays. This will cause it to become hard. However, if the same type of homemade ice cream is packed in a dasher type freezer, with chipped ice and salt being packed around the outside ice container, and the freezer is then rotated thereby constantly agitating the ice cream mix while it is being frozen, a slightly crystallized ice cream will result. This type of ice cream is quite tasty and palatable as it comes from the freezer, and is preferred by many people to the smooth, satiny, commercial type.

However, in order to make such ice cream, a lot of time, trouble and expense is involved. For example, all the ingredients must be mixed together, an ice cream dasher type freezer must be bought, salt and ice must be packed around the outside of the ice container, and then it must be churned and frozen. Furthermore, the entire process is very messy since salt water drains constantly out of the freezer, and thereby presents a disposal problem.

My invention concerns the processing of homemade ice cream mix that may be manufactured by dairy companies and that permits easy preparation in the home of homemade ice cream. The homemade ice cream mix is poured into molds of a suitable size and is then frozen, with no agitation. The frozen blocks or cubes would then be packaged and delivered to the retailer's freezer compartment, as today's commercial ice cream is. However, in this particular form, it would be quite untasty and almost completely crystallized. The buyer would store these blocks or cubes in the regular freezing compartment of a refrigerator. When it is desired to serve homemade type ice cream, the blocks would be placed in an agitator, and further ingredients might then be added depending upon the concentration level of the frozen blocks.

It is therefore an object of invention to provide a process for taking a frozen, separated, crystallized, and untasty concoction, and convert it to a smooth, tasty, homemade type ice cream dessert.

It is another object of invention to freeze a mixture of ordinary homemade ice cream mix without the use of chipped ice, salt and churning, and at a later time to convert it to homemade type ice cream by agitation.

It is another object of invention to decrystallize ordinary homemade ice cream, after it has been frozen, without agitation.

These and other objects of invention will be apparent from the following specification.

Various types of homemade ice cream mixes may be made, and then frozen, without churning with chipped ice and salt surrounding the ice container.

One example of the relative percentages in fluid ounces is the following full strength unconcentrated mixture:

Mixture I

| Ingredients: | Percentage |
| --- | --- |
| Whole milk | 55.1 |
| Condensed milk | 18.6 |
| Sweetened condensed milk (for example Dime brand) | 18.6 |
| Eggs (whole) | 7.0 |
| Vanilla extract | 0.7 |

The above ingredients are mixed well without cooking, although some people may prefer to scald the whole milk first and then whip it into the other ingredients. The mix is then poured into blocks or cubes for freezing, just like an ordinary ice cube. When frozen the mixture is of a rather hard consistency, although it is gummier than ice.

It is this type of mixture that would be made and frozen by the commercial dairy companies for delivery to the retailer. When the buyer is ready to make homemade type ice cream, the cubes would be dropped into an agitator, the churning action of the agitator blades returning the mixture to the approximate consistency that it would have had, had it been hand-churned in an ice cream freezer. The purpose of the agitator, which may be a home blender, is to completely mix the mixture, as well as to shred the ice particles formed when the mixture was initially frozen without agitation. To facilitate blending of this full strength mixture, when there is little or no liquid present, it helps considerably to press the cubes down into the blades of the blender.

A second mixture which may be used is the same as above except that an amount of fruit equal to approximately 20% of the weight of Mixture I is added to make a fruit flavored ice cream. Any type of fruit may be added depending upon the flavor desired. The fruit may be added before the initial freezing, or during the blending process, with approximately the same results.

In a more concentrated mixture than Mixture I, the relative percentages in fluid ounces of the ingredients are as follows:

Mixture III

| Ingredient: | Percentage |
| --- | --- |
| Whole milk | 48.0 |
| Condensed milk | 21.6 |
| Sweetened condensed milk (for example Dime brand) | 21.6 |
| Eggs (whole) | 8.0 |
| Vanilla extract | 0.8 |

It will be noted that this is substantially the same formula as Mixture I, except that about 15% less whole milk is utilized. The mixture is then frozen without agitation in cubes or blocks. When frozen, it is very similar to the full strength Mixture I, but it is not as hard as ice, and is slightly gummy. When the mixture is blended, an addition of a volume of whole milk equal to 16.7% of the total volume of Mixture III is made. The addition of the liquid whole milk facilitates belnding, but slightly reduces the frozen consistency of the finished blended product. It follows that the more whole milk added to the frozen cubes or blocks during the blending process, the less frozen or crystalline will be the final blended product.

Of course, a manufacturer with transportation and storage costs in mind, will want to have an initial frozen mix of the highest possible concentration. However, if too much liquid whole milk is added to the frozen mix during blending, the final consistency is more "soupy" than ice cream. However, when blending a highly concentrated frozen mix of this type, the addition of several ordinary ice cubes to the blender results in a suspension of finely chopped-up ice throughout the mixture, which results in a firmer, final consistency product. Furthermore, the taste is substantially the same as the less concentrated, full strength final product obtained from Mixture I. Thus, the whole milk added during the blending process reduces the consistency of the final product, but the ice cubes counteract this, and produce a final product of acceptable firmness and taste. Depending upon the concentration of the mixture prepared by commercial dairies, the buyer could easily be told how much whole milk and ice cubes, if any, to add during the blending process.

Having thus described my invention, I claim the following:

1. A process for making homemade type ice cream comprising:
   (a) mixing without soft freezing predetermined relative percentages of whole milk, condensed milk, sweetened condensed milk, egg and vanilla extract;
   (b) sequentially hard freezing said mixture into storage blocks without agitation;
   (c) thereafter confinably crushing and pressure churning the storage blocks of said mixture producing thereby homemade type ice cream.

2. The process for making homemade type ice cream as described in claim 1 further comprising simultaneously adding a predetermined amount of whole milk while agitating and pressure crushing.

3. The process as described in claim 2 further comprising simultaneously adding a predetermined amount of ice when agitating and pressure crushing.

References Cited

UNITED STATES PATENTS

| | | | |
|---|---|---|---|
| 2,002,963 | 5/1935 | Schade | 99—136 |
| 2,756,153 | 7/1956 | Eyestone | 99—136 |

OTHER REFERENCES

Marsh, D. B., ed., The Good Housekeeping Cook Book, Rinehart & Co., Inc., 1942, pp. 631–634. TX 715 G62, 1949, C.2.

A. LOUIS MONACELL, *Primary Examiner.*

J. M. HUNTER, *Assistant Examiner.*